US011526027B2

(12) United States Patent
Giovannone

(10) Patent No.: US 11,526,027 B2
(45) Date of Patent: Dec. 13, 2022

(54) INTERCHANGEABLE HINGE FOR MODULAR EYEWEAR

(71) Applicant: Katherine Giovannone, Markham (CA)

(72) Inventor: Katherine Giovannone, Markham (CA)

( * ) Notice: Subject to any disclaimer, the term of this patent is extended or adjusted under 35 U.S.C. 154(b) by 0 days.

(21) Appl. No.: 17/000,275

(22) Filed: Aug. 22, 2020

(65) Prior Publication Data

US 2022/0057650 A1    Feb. 24, 2022

(51) Int. Cl.
*G02C 5/22* (2006.01)

(52) U.S. Cl.
CPC ......... *G02C 5/2272* (2013.01); *G02C 5/2218* (2013.01); *G02C 2200/08* (2013.01)

(58) Field of Classification Search
CPC ...... G02C 5/22; G02C 5/2209; G02C 5/2218; G02C 5/2272
USPC .................................... 351/121, 153; 16/228
See application file for complete search history.

(56) References Cited

U.S. PATENT DOCUMENTS

| 5,059,017 | A | * | 10/1991 | Bennato | G02C 5/10 351/121 |
| 5,386,254 | A | * | 1/1995 | Kahaney | G02C 3/003 351/116 |
| 5,408,279 | A | * | 4/1995 | Chiou | G02C 3/04 351/121 |
| 7,055,953 | B1 | * | 6/2006 | Yves | G02C 5/008 16/228 |
| 2013/0314661 | A1 | * | 11/2013 | Masse | G02C 5/2272 351/153 |
| 2016/0320632 | A1 | * | 11/2016 | Paulet Vazquez | G02C 5/2272 |

\* cited by examiner

*Primary Examiner* — Darryl J Collins
(74) *Attorney, Agent, or Firm* — Andrews Robichaud PC; Alessandro Colonnier

(57) ABSTRACT

A wearable lightweight, adjustable, and comfortable modular eyewear with multiple interchangeable components includes: a central frame with two eyeglass supporting members, lenses, temple and hinge. The assembly has a hinge which is designed to fit the frames. The fronts and temples are grooved to allow the hinge to fit snuggly into the grooves. The hinge is flexible that it will allow the temples to flex 180+ degrees.

16 Claims, 3 Drawing Sheets

INTERCHANGEABLE HINGE FOR MODULAR EYEWEAR

BACKGROUND

Field of the Invention

This invention relates to protective eyewear, and more particularly relates to protective eyewear having an interchangeable hinge for modular eyewear which can be easily removed and exchange, thus allowing for quick assembly. The hinge is universal in shape and design, thereby permitting for one hinge to fit on both sides of the eyeglass frame allowing for easy assembly with no tools.

Description of the Related Art

Myriad types of eyewear have been used through the ages to improve eyesight or protect the eyes. For example, prescription lenses in the form of contact lenses or glasses are used to correct sight.

In industrial environments, eye protection is worn to protect the eyes from hazards including flying debris, air or gas jets, grit, sparks, acid splatters and strong energy sources such as welding arcs, lasers, and ultraviolet light. In medical environments, medical professionals such as surgeons and dentists wear protective eyewear to provide protection against entry into the eye of bodily fluids or other potentially infectious or damaging substances from a patient. Surgeons and dentists may also need to use magnification devices or other optical instruments whist carrying out procedures on patients. Many sporting or leisure pursuits require eye protection. For example, scuba divers require face masks to be able to see underwater, whilst skiers require tinted, wrap around glasses or goggles to protect their eyes from wind, particles of snow and UV radiation.

Conventional eyewear are vision aids consisting of glass or hard plastic lenses mounted in a frame that holds them in front of a person's eyes, typically utilizing a bridge over the nose and temples which rest over the ears.

While eyewear may have multiple functions, it is usually made for a specific purpose. For example, a scuba divers face mask or skier's goggles may include prescription lenses but can be used for no other purpose than scuba diving or skiing, respectively.

Similarly, eyewear for use in industrial environments usually has no application outside the industrial environment.

This limited functionality of eyewear can be particularly inconvenient in certain applications. For example, a fly fisherman may stand at a river from dawn to dusk, in a wide range of light conditions, requiring several changes of eyewear to different polarizing lenses so that the fish may be seen indifferent light levels. Given the relatively high cost of a single pair of spectacles, it is not viable for a fisherman to have multiple pairs, each having a different set of polarizing lenses.

Apart from specialist applications such as fly fishing, many people wear spectacles, and most have at least two pairs—a prescription pair and prescription sunglasses. They may also have a scuba diving mask with prescription lenses and/or skiing goggles with prescription sunglass lenses.

There are multiple types of advancements that have been seen in prior art in similar regards. For instance, a Protective eyewear with interchangeable decorative frames bearing U.S. Pat. No. 4,878,749A is issued to James E. McGee. The patent is on a protective eyewear which may be tinted for use as sunglasses having a preformed one-piece lens arrangement with a recessed border and removable temples hinged to the preformed lens. The removable temple pieces have posts which fit sockets at opposite upper and lower ends of the preformed lens. Interchangeable decorative frames allow the wearer to change the appearance of the protective eyewear at will. The interchangeable decorative frames have pins which snap into the sockets used for the hinges for the temple pieces allowing the frame to be easily removed and replaced with a different color or design decorative frame.

Another patent on Modular eyeglasses with interchangeable temples and facades bearing U.S. Pat. No. 9,400,398B2 is issued to FUNOOGLES LLC. The patent is on a modular eyewear with multiple interchangeable components includes: a) a central frame with two eyeglass supporting members, lens and a bridge member; b) lenses, c) at least two temple members, hinges and removably connected to the central frame at opposite ends thereof, d) two temple quick release mechanisms; e) a lens-free facade member removably attached to the central frame. A user may wear the modular eyewear with or without the facade and with matching, non-matching, or substitute temple members.

Another patent on Interchangeable eyewear/head-mounted device assembly with quick release mechanism bearing U.S. Pat. No. 9,851,567B2 is issued to Google LLC. The patent implies a head-mounted device includes a central frame support and at least one removably connected optics arm. The at least one optics arm has first and second free ends that are removably connected to a second end of the central frame support at a point between the first and second free ends. The optics arm extends away from the central frame support and is configured to present information to the user via a display device.

Another patent on Modular eyeglasses bearing Australian patent 2,011,258977B2 is issued to Francis William Austin. The patent is on an eyeglass assembly formed of detachable and interchangeable parts. The assembly comprises detachable upper and lower frame parts that define an aperture for receiving lenses or a lens assembly. Two interchangeable temple arms are pivotally connected to the upper and lower frame parts and assist in holding the eyeglass assembly together. The eyeglasses advantageously allow a wearer, manufacturer, designer, distributor and/or retailer to vary the shape, style, size or colour of the eyeglasses to suit their requirements by a simple interchange of parts. Other embodiments are directed to eyeglass components formed from heat dissipating material, specifically temple arms comprising an insert formed of a heat dissipating material such as a polymer or aluminum.

Another patent on Modular eyewear system bearing U.S. Pat. No. 7,431,453B2 is issued to OPTHALMIC ENGINEERING Pty Ltd Ophthalmic Engr Pty Ltd. The patent is on a modular eyewear system (700) including magnetic mounting means for releasable magnetic mounting of one or more eyewear elements (710) such as a loupe assembly or a similar magnification system to a frame member for wearing on a wearer's head. Both the frame member and the loupe assembly are provided with complementary magnetic mounting means, whereby the loupe or magnification system is releasably mountable to the frame member. Other elements of the modular system include light delivery means, eyesight correction lenses, protective eye shields, adjustable nosepieces, optical filter elements, masks and helmets, the system allowing these elements to be used separately or together depending on the desired use.

Another patent on Modular eyeglasses with interchangeable temples and facades bearing U.S. Pat. No. 9,400,398 B2 is issued to FUNOOGLES LLC. The patent is on a modular eyewear with multiple interchangeable components includes: a) a central frame with two eyeglass supporting members, lens and a bridge member; b) lenses, c) at least two temple members, hingedly and removably connected to the central frame at opposite ends thereof, d) two temple quick release mechanisms; e) a lens-free facade member removably attached to the central frame. A user may wear the modular eyewear with or without the facade and with matching, non-matching or substitute temple members.

U.S. Pat. No. 7,645,039 B2 to Sheldon describes an eyewear is provided having an interchangeable lens or temple portion. The eyewear comprises an interchangeable lens portion comprising a lens portion having an upper and a lower edge, and a left and a right lens region extending sideward each having a distal end; a pair of connecting members, each having a proximate end and a distal end and a hollow receiving area therein beginning at the proximate end and running into the connecting member; the distal end of the lens regions being shaped to fit within the proximate end of the connecting members wherein, the lens regions are releasably accepted and held within the hollow receiving area of the connecting members; and wherein the connecting members are releasable from the lens portion by applying a torsional force on one of the connecting member and the lens portion.

U.S. Pat. No. 7,621,633 B1 to Foster describes a modular eyeglass frame that includes a lens frame and a plurality of handles with oppositely facing first and second sides. Each side may include unique surface indicia. A mechanism for interchangeably connecting the handles to the lens frame may further be included. A coupling may be attached to a proximal end of one of the handles. Helical spring members may be mated to the coupling at one end and may include a bearing at another end. Receiving blocks may be attached to the lateral ends of the lens frame and may feature sockets formed in an inner wall thereof, to receive each bearing. Grooves may be formed in lateral sides of the receiving blocks. Such grooves may be effectively axially aligned with locking arms such that the locking arms are interfitted inside the grooves when the coupling is interfitted between the receiving blocks.

U.S. Pat. No. 7,059,717 B2 to Bloch describes an eyeglasses apparatus and transformation system thereof, facilitating quick and easy convertibility of the left and right traditionally folding temples into an adjustable headband; thereby making the light-weight eyeglasses much more suited to dynamic activities such as jogging, skiing, and cycling for example. The user of this eyewear can advantageously move between more sedentary situations, where the extreme appearance of eye-goggles would appear very out of place—yet by manually releasing an inconspicuously integrated pair of bifurcated retention-latches located immediately afterward of both temple-hinges, the temples can be instantly detached and readily interchanged with a headband employing similar slide-in bayonet-type retention-latches. The disclosure identifies a particularly critical human-factors problem addressed by the uniquely configured finger operated opposed latches; plus, the notion of my slim-lined detachable-temples, enables a host of optional companion accessory temple embodiments, facilitating a miniature radio, cell-phone, or digital-camera—conveniences for the person on the go!.

U.S. Pat. No. 6,834,952 B2 to Polovin describes a pair of glasses that includes a lens frame supporting a pair of lenses. The frame includes rearwardly extending temple mountings to which there is releasably attached temples. The temples are releasably attach to the mountings by means of clip assemblies.

U.S. Pat. No. 6,178,561 B1 to Cheng describes safety goggles that include a primary frame having a top provided with two raised seats and an upwardly extending tongue between the two raised seats, each of the seats having a first pin extending outwardly longitudinally from an end thereof and a second pin extending outwardly longitudinally from another end thereof, a lens frame having a top provided with two cavities aligned with the two raised seats, each of the cavities being formed with a groove and an opening configured to receive the first pin and the second pin respectively, a recess being formed between the two cavities and aligned with the tongue, the recess having an inclined surface at an outer side thereof and a chamfer at an inner side thereof, the chamfer being located close to the opening, whereby the goggles can be rapidly manufactured and assembled.

U.S. Pat. No. 5,357,292 to Wiedner describes glasses, in particular industrial safety or sports glasses, with an integral continuous sight piece and with inclination-adjustable side pieces articulated on a frame piece it is provided for the purpose of defined and reliable inclination-adjustment accompanied by the advantage of low-cost manufacturing that the sight piece has lateral backwards oriented appendixes formed in one piece with it and extending about in parallel to the wearer's head, that a frame piece with lateral appendixes is arranged along the upper edge of the sight piece surrounding the latter and the latter's appendixes, that the frame piece with the articulated side pieces is supported on the sight piece pivotably around a horizontal pivot axis, in that pins are arranged on the inside of each of the appendixes, that the pins engage with semicircular slits concentric of the pivot axis in the appendixes of the sight piece, wherein, to arrest the pins in certain angular positions of the slits, the latter are formed by a plurality of approximately annular locking recesses intersecting to form locking protrusions and approximately corresponding to the cross-section of the pin.

U.S. Pat. No. 5,335,025 to Wang describes a sunshade and sunglasses which may be interchangeably detachably attached to vision correcting eyeglasses is provided. The attachment being by means of flexi-grip-catch pairs. A pair of flexi-grips are integrally formed on the top of an eyeglass frame for correcting lenses and are adapted for being received by a first pair of catches that are integrally formed on the top of a frame of a pair of sunglasses which has no temples, or a second pair of catches fixedly positioned underneath a sunshade. The positions of the respective first and second pairs of catches are in alignment with the position of the flexi-grips. By pressing the first pair of catches onto the respective flexi-grips, the sunglass lenses are pivotally attached thereon.

There are multiple solutions that have been presented in prior art. However, these solutions are limited and restricted to their conventional architecture, installation system and have considerable shortcomings which adversely affect the convenience with which they can be used. The prior systems have certain limitations including the design of assemblies which make them not suitable for every type of user. Moreover, the ease of use ability of these assemblies is also questionable.

It must be noted that the current invention proposes an assembly with an advancement of an inter-changeable hinge for modular eyewear. The fronts and temples of the frames will be made of high-quality plastic and is grooved so that the hinge, which is U-shaped, will slide into the groove. The hinge will be made of resilient polymeric material such as elastomeric material or silicone that will allow for 180 degree move ability but will go back into place. There will be no screws or other hardware needed for this to work. The hinge is also universal so 1 hinge will fit both the left side and the right side.

None of the previous inventions and patents, taken either singly or in combination, is seen to describe the instant invention as claimed. Hence, the inventor of the present invention proposes to resolve and surmount existent technical difficulties to eliminate the aforementioned shortcomings of prior art.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

The primary desirable object of the present invention is to provide a novel and improved form of a modular eyewear system with interchangeable components.

Another object of the present invention is to provide a protective eyewear that can be changed to provide a wide variety of designs.

Another object of this invention is to provide a new and improved eyewear according to this invention which is designed to be worn on a wearer's face and includes a protective eyewear that can be selectively changed to provide a different appearing frame.

It is an object of the invention in one of its aspects to provide a modular eyewear which includes: a central frame with two eyeglass supporting members; an eyeglass lens located in each of the two eyeglass supporting members; at least two removable interchangeable temples attached to the frame; quick release universal hinge for removing and attaching temples to the frame.

It is another objective of the invention to provide a main assembly with hinge which is designed to only fit frames. The fronts and temples are grooved to allow the hinge to fit snuggly into the groove. The hinge is flexible that it allows the temples to flex 180+ degrees.

It is another object to provide a reliable construction which includes hinge is that you can use it on either the left or right side of the frame which means it is universal. This assembly is ideal for both women, men and kids suitable for cycling, camping, running, travel, climbing and daily use.

Yet another object of the present invention is to provide a modular eyewear structure that is relatively inexpensive to produce so that ownership is available to a substantial majority of families.

It is also the objective of the invention to provide a smart assembly which provide ease of use and convenience to everyone.

It is a further aspect of the present invention to provide a new and improved assembly which is of a durable and reliable construction and can sustain its effectiveness after multiple and consistent use.

Thus, it is the objective to provide a new and improved eye wear assembly. Other aspects, advantages and novel features of the present invention will become apparent from the detailed description of the invention when considered in conjunction with the accompanying drawings.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
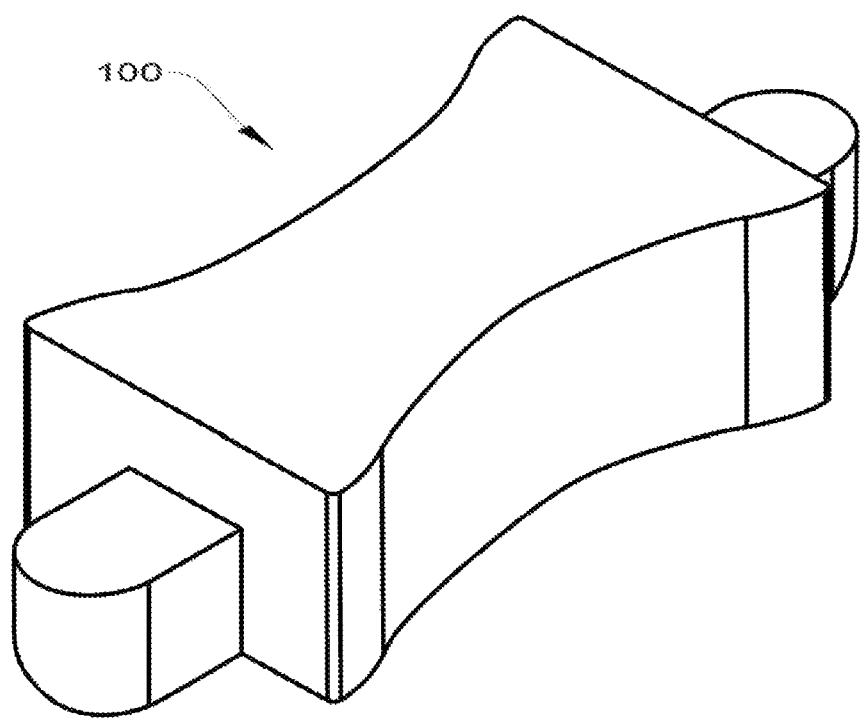
FIG. 1 illustrates the hinge part, as per preferred embodiments of the invention.
Figure 2:
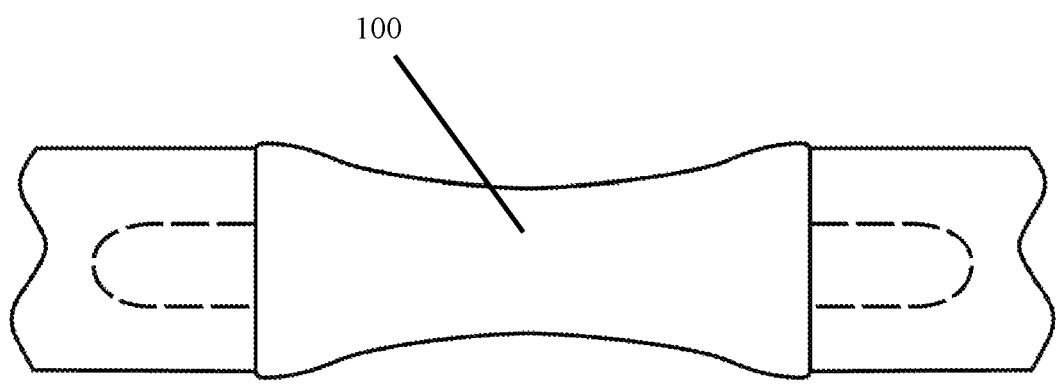
FIG. 2 illustrates the groove part, as per preferred embodiments of the invention.
Figure 3:
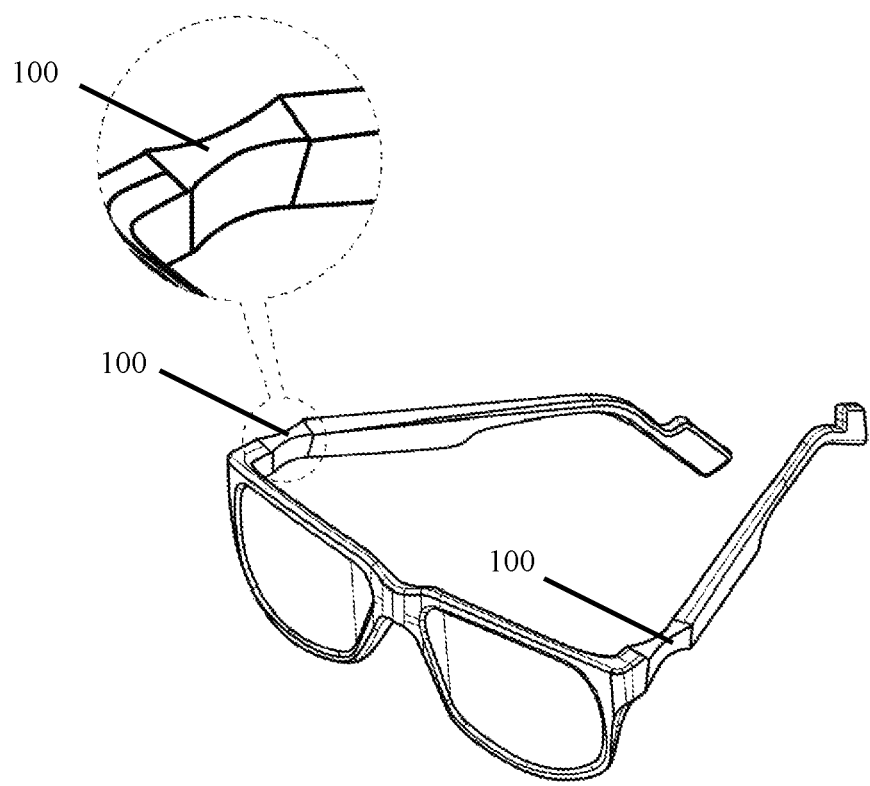
FIG. 3 illustrates the groove, hinge, and frames part, as per preferred embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Detailed descriptions of the preferred embodiment are provided herein. It is to be understood, however, that the present invention may be embodied in various forms. Therefore, specific details disclosed herein are not to be interpreted as limiting but rather as a basis for the claims and as a representative basis for teaching one skilled in the art to employ the present invention in virtually any appropriately detailed system, structure or manner.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprise" and/or "comprising," when used in this specification, specify the presence of stated features, steps, operations, elements, and/or components, but do not preclude the presence or addition of one or more other features, steps, operations, elements, components, and/or groups thereof.

The present invention as directed for modular eyewear includes: a central frame with two eyeglass supporting members, otherwise known as the frame front; an eyeglass located in each of the two eyeglass supporting members; at least two removable interchangeable temples attached to the frame; quick release hinges for removing and attaching temples to the frame front.

The central frame has a front, a back and peripheral sides, and has at least two eyeglass supporting members for support two lenses and has a bridge member symmetrically positioned between and connecting the two eyeglass supporting members, for resting directly or indirectly on the nose of a user.

The fronts and temples of the frames will be made of high-quality resilient plastic and is grooved so that the U-shaped hinge (100), will slide into the groove (301). The hinge (100) will be made of silicone—that will allow for 180 degree move ability but will go back into place. There will be no screws or other hardware needed for this to work. The hinge is also universal so 1 hinge will fit both the left side and the right side. The connection is a male-female one, where the hinge fitting is U-shaped on both sides and it slides into the grooves of the frame front and the temple.

As mentioned, an eyeglass lens is located in each of two eyeglass supporting members, and the eyeglass lens is selected from the group consisting of non-prescription glass, prescription glass, non-prescription plastic, prescription plastic and combinations thereof. Any of these may or may not be safety glasses.

There are at least two temple members, hinged and connected to the central frame at opposite ends thereof. Preferably, there is one hinge member on each side (left and right temples) which will allow quick release mechanisms and are connected to the frame at opposite ends thereof and each connected to one of the temple members, so as to permit quick release of each of at least a portion of the temple member for interchangeability with other mechanically similar, different temple members. The frame front attaches to the hinge which attaches to the temple. With this invention, a user may wear the modular eyewear with matching, non-matching, or substitute temple members.

While a specific embodiment has been shown and described, many variations are possible. With time, additional features may be employed. The particular shape or configuration of the platform or the interior configuration may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A modular eyewear comprising:
    a central frame comprising a first central frame groove and a second central frame groove;
    a pair of hinges each comprising a first protrusion and a second protrusion, each of the first protrusions configured to fit into any one of the first central frame groove and the second central frame groove; and,
    a pair of temple members each comprising a temple member groove;
    wherein each of the second protrusions are configured to fit into any one of the temple member grooves;
    wherein each one of the pair of hinges is symmetrical along a longitudinal axis; and,
    wherein each of the first protrusions and each of the second protrusions are U-shaped.

2. The modular eyewear of claim 1, wherein the pair of hinges are made from a resilient polymeric material allowing the pair of hinges to flex up to 180-degrees.

3. The modular eyewear of claim 2, wherein the resilient polymeric material is silicone.

4. The modular eyewear of claim 1, wherein the central frame further comprises two eyeglass supporting members, each of the two eyeglass supporting members configured to support an eyeglass lens.

5. The modular eyewear of claim 4, wherein the central frame further comprises a bridge member positioned between the two eyeglass supporting members, the bridge member configured to rest on a nose of a user.

6. The modular eyewear of claim 1, wherein the central frame and the pair of temple members are made of plastic.

7. The modular eyewear of claim 1, wherein each of the first and second protrusions have a base that is flush with an underside of the pair of hinges.

8. The modular eyewear of claim 1, wherein each of the second protrusions are configured to fit into any one of the first central frame groove and the second central frame groove, and each of the first protrusions are configured to fit into any one of the temple member grooves.

9. A modular eyewear comprising:
    a central frame comprising a first central frame groove and a second central frame groove;
    a pair of hinges each comprising a first protrusion and a second protrusion, each of the first protrusions configured to fit into any one of the first central frame groove and the second central frame groove; and,
    a pair of temple members each comprising a temple member groove;
    wherein each of the second protrusions are configured to fit into any one of the temple member grooves;
    wherein each one of the pair of hinges is symmetrical along a longitudinal axis; and,
    wherein each of the first and second protrusions have a base that is flush with an underside of the pair of hinges.

10. The modular eyewear of claim 9, wherein each of the first protrusions and each of the second protrusions are U-shaped.

11. The modular eyewear of claim 9, wherein the pair of hinges are made from a resilient polymeric material allowing the pair of hinges to flex up to 180-degrees.

12. The modular eyewear of claim 11, wherein the resilient polymeric material is silicone.

13. The modular eyewear of claim 9, wherein the central frame further comprises two eyeglass supporting members, each of the two eyeglass supporting members configured to support an eyeglass lens.

14. The modular eyewear of claim 13, wherein the central frame further comprises a bridge member positioned between the two eyeglass supporting members, the bridge member configured to rest on a nose of a user.

15. The modular eyewear of claim 9, wherein the central frame and the pair of temple members are made of plastic.

16. The modular eyewear of claim 9, wherein each of the second protrusions are configured to fit into any one of the first central frame groove and the second central frame groove, and each of the first protrusions are configured to fit into any one of the temple member grooves.

\* \* \* \* \*